(12) United States Patent
Stewart

(10) Patent No.: US 12,390,867 B2
(45) Date of Patent: Aug. 19, 2025

(54) CUTTING TOOL

(71) Applicant: Rotech Group Limited, Aberdeen (GB)

(72) Inventor: Donald Stewart, Aberdeen (GB)

(73) Assignee: Rotech Group Limited, Aberdeen (GB)

( * ) Notice: Subject to any disclaimer, the term of this patent is extended or adjusted under 35 U.S.C. 154(b) by 0 days.

(21) Appl. No.: 16/182,794

(22) Filed: Nov. 7, 2018

(65) Prior Publication Data

US 2019/0134724 A1    May 9, 2019

(30) Foreign Application Priority Data

Nov. 8, 2017    (GB) ...................................... 1718480
Nov. 5, 2018    (GB) ...................................... 1818030

(51) Int. Cl.
*B23D 33/02*    (2006.01)
*B23D 21/00*    (2006.01)
*B23D 29/00*    (2006.01)
*B23D 35/00*    (2006.01)
*B63C 11/52*    (2006.01)
*E02D 9/04*    (2006.01)

(52) U.S. Cl.
CPC ............. *B23D 33/02* (2013.01); *B23D 21/00* (2013.01); *B23D 29/002* (2013.01); *B23D 35/001* (2013.01); *B63C 11/52* (2013.01); *E02D 9/04* (2013.01)

(58) Field of Classification Search
CPC ...... B23D 33/02; B23D 29/002; B23D 21/00; B23D 35/001; B63C 11/52; F16L 1/12; F16L 1/166; E02D 9/04; H02G 1/00
See application file for complete search history.

(56) References Cited

U.S. PATENT DOCUMENTS 3,578,233  A  *  5/1971  Meister ..................... F16L 1/26
                                                228/234.3
3,664,391  A  *  5/1972  Coffey ................. A01G 23/081
                                                   83/151
(Continued)

FOREIGN PATENT DOCUMENTS

CN    102889262 B  *  4/2015
EP       0312619 A1     4/1989
(Continued)

OTHER PUBLICATIONS

Extended European Search Report; Appl. No. EP 18 20 4574; Mar. 5, 2019; 9 pages.

*Primary Examiner* — Jonathan G Riley
(74) *Attorney, Agent, or Firm* — Dickinson Wright PLLC

(57) ABSTRACT

An underwater tool (5; 205; 305) including a grabber arrangement (15; 215; 315) and a cutter arrangement (20; 220; 320) connected together. The grabber arrangement comprises a plurality of grabber elements (30; 230; 330) disposed on first and second sides (35*a*; 235*a*; 335*a*; 35*b*; 235*b*; 335*b*) of the tool. The cutter arrangement includes a cutter slot (75; 275; 375), an anvil (80; 280; 380) movable to close the slot comprises an anvil and a cutter blade (90; 290'; 390). In use, a cable (10; 210; 310) is held by the grabber arrangement, and thereby moved into the slot which is then closed by the anvil so as to entrap the cable within the slot. The cutter blade is then driven against the anvil so as to cut the cable.

21 Claims, 16 Drawing Sheets

(56) References Cited

U.S. PATENT DOCUMENTS

| | | | | |
|---|---|---|---|---|
| 3,727,600 | A * | 4/1973 | Schlough | B28D 1/222 |
| | | | | 125/23.01 |
| 4,261,399 | A * | 4/1981 | Hawkins | B27M 1/00 |
| | | | | 144/34.5 |
| 4,641,694 | A * | 2/1987 | Rohde | B27M 1/00 |
| | | | | 144/195.1 |
| 4,802,517 | A * | 2/1989 | Laster | A01G 23/087 |
| | | | | 114/151 |
| 5,044,827 | A * | 9/1991 | Gray | F16L 1/166 |
| | | | | 405/173 |
| 5,139,006 | A * | 8/1992 | Trudeau | B28D 1/222 |
| | | | | 125/12 |
| 5,979,518 | A * | 11/1999 | Hamby | A01G 23/08 |
| | | | | 144/335 |
| 7,351,010 | B1 * | 4/2008 | Kelly | F16L 1/166 |
| | | | | 405/158 |
| 7,631,608 | B1 | 12/2009 | Lombardi et al. | |
| 10,159,201 | B2 * | 12/2018 | LaTendresse | B26D 7/02 |
| 2006/0115331 | A1 * | 6/2006 | Matteucci | F16L 1/12 |
| | | | | 405/156 |
| 2010/0043609 | A1 * | 2/2010 | Franze | B23D 21/00 |
| | | | | 83/13 |
| 2011/0023999 | A1 | 2/2011 | Milne et al. | |
| 2012/0117959 | A1 * | 5/2012 | Lewkoski | B23D 57/0084 |
| | | | | 60/431 |
| 2013/0336724 | A1 * | 12/2013 | Narold | B23K 9/0061 |
| | | | | 405/195.1 |
| 2014/0147217 | A1 * | 5/2014 | Ammerlaan | B23D 57/0084 |
| | | | | 405/203 |

FOREIGN PATENT DOCUMENTS

| | | |
|---|---|---|
| EP | 0699804 | 3/1996 |
| EP | 3431233 A1 | 1/2019 |
| FR | 2623738 A1 | 6/1989 |
| GB | 2464342 * | 10/2008 |
| WO | 2010043850 A1 | 4/2010 |
| WO | 2012108765 A1 | 8/2012 |
| WO | 2017099607 A1 | 6/2017 |

* cited by examiner

CUTTING TOOL

This U.S. Patent Application claims the benefit of GB 1818030.7 filed on Nov. 5, 2018 and GB 1718480.5 filed on Nov. 8, 2017, the entire disclosures of which are incorporated herein by reference.

FIELD OF THE INVENTION

The present invention relates to an improved grabber/grabbing and/or cutter/cutting tool or device, to an apparatus comprising said tool, and to a method using said tool. The invention particularly, though not exclusively, relates to an underwater/subsea grabber and/or cutter tool, e.g. for grabbing and/or cutting an underwater cable, conduit, pipe or the like. The tool of the present invention may conveniently be referred to as a cutting cable grab.

BACKGROUND OF THE INVENTION

Subsea cables, including telecommunications cables and power cables (e.g. for offshore windfarms)—which may have a range of diameters from 25 mm to 300 mm—are frequently damaged during installation or develop faults during operation. In order to facilitate repair it is necessary to cut the cable(s) and then recover such to a ship's deck for repair. In some circumstances this may be done with a cutting grapnel, which is a tool that is dragged along the seabed, hooks onto the cable and lifts the cable up off the seafloor, then cuts through the cable as the tension on the cable mounts. This tool is not suitable for larger, more heavily armoured cables.

Alternatively, the cut and retrieve operation is often done in two stages with a mechanical cutter and a grabbing tool. Firstly, the cable is cut with a cutting tool, usually deployed by crane wire from a ship, or maneuvered into place by an ROV (Remotely Operated Vehicle). Secondly, after the cable has been cut, a grabbing tool or a grapnel is deployed to catch one end of the cut cable and bring such to surface.

A known and favoured method of cutting this type of cable is a hydraulically actuated anvil type cutter. This type of cutter, by necessity, has a relatively small slot which must be maneuvered precisely into place to engage with the cable. A thick, solid steel rod—known as an anvil—is then slid across the bottom of the slot, capturing the cable. A hydraulically driven blade is then deployed which cuts through the cable against the anvil.

Common problems with the use of such a cutter are locating the cutter onto the cable successfully due to the relatively small size of the slot, breakage of blades caused by lateral forces on the cutter, and failure to cut due to the anvil not being fully engaged. Such a cutter requires the cable to be in free suspension in order for the anvil to be able to pass underneath the cable and to allow the cutter to operate.

It is an object of at least one embodiment of at least one aspect of the present invention to obviate and/or mitigate one or more problems and/or disadvantages in the prior art.

At least one embodiment of at least one aspect of the present invention at least aims to speed up/increase a success rate of cable cutting and recovering operations.

It is an object of at least one embodiment of at least one aspect of the present invention to:
 (a) combine both grabbing and cutting operations into a single tool/apparatus/method; and/or
 (b) mount a grabber and a cutter to each other in such way that the grabber holds a cable while the cutter is guided onto the cable, then holds the cable stationary with respect to the cutter while a cut is made.

SUMMARY OF THE INVENTION

According to the present invention there is provided a tool, an apparatus and/or a method according to the appended claims.

According to a first aspect of the present invention there is provided a tool or device, such as an underwater/subsea/subsurface tool, comprising a grabber arrangement or means and/or a cutter arrangement or means.

The tool or device may comprise a cable grabber and cutter tool.

Beneficially, the grabber arrangement and the cutter arrangement may be connected together or arranged in a set/preset disposition relative to one another, e.g. adjacent one another, e.g. in longitudinal disposition to one another. The grabber arrangement and the cutter arrangement may be directly or indirectly connected together, e.g. rigidly connected together, e.g. by one or more rigid members and/or a frame.

Advantageously, the grabber arrangement may comprise a plurality of grabber elements.

The grabber arrangement or grabber elements may comprise one or more first grabber elements and one or more second grabber elements.

The first grabber element(s) may be disposed on a first side of the tool. The second grabber element(s) may be disposed on a second side of the tool. The first/second grabber elements may be pivotably attached to a (main) body of the tool. The first/second grabber elements may be conveniently referred to as arms or fingers. The first/second grabber elements may be curved or arcuate in shape.

A concave surface of each (first/second) grabber element may face or be faceable towards a centre line of the tool. A convex surface of each grabber element may face or be faceable away from a/the centre line of the tool. The/each grabber element may be claw, talon or tine shaped.

When in an open disposition the/each first/second grabber element may be disposed on a/the respective first/second side of the tool.

When in a closed disposition a distal end of each first/second grabber element may be disposed on a/the respective second/first side of the tool.

By this arrangement in said open disposition the grabber elements may provide an open jaw for receiving a cable.

By this arrangement in said closed disposition the grabber elements may provide a closed jaw, beneficially having a throughhole or internal/closed space, e.g. for grabbing and/or holding and/or retaining a cable, conduit or the like.

The throughhole or closed space may comprise a transversely closed space. The through-hole may comprise a longitudinally extending throughhole.

It will be appreciated from the above that, in use, the grabber elements may be movable in co-action so as to provide a scissor type action.

The tool may comprise a longitudinally extending line, e.g. centre line. The line may be coincident with a position where a cable is grabbed (and/or retained) by the tool, in use.

The throughhole or internal/closed space may be centred on the line.

The grabber arrangement and the cutter arrangement may be spaced one from the other along or on said line.

The grabber arrangement and the cutter arrangement may be provided proximal or adjacent one another along or on said line.

The cutter arrangement may comprise a cutter body. The cutter body may be slidably attached to a/the main body of the tool. The cutter body may move or slide or be movable or slidable perpendicularly to said line, preferably along a second line which second line intersects said line.

The cutter body may comprise a cutter slot. The cutter slot may be disposed transverse to the line. The grabber elements may be disposed (e.g. so as to move) transverse to the line. The slot may be adapted for receiving a cable or conduit. The cutter body may be movable along said second line such that the slot coincides with the line. In this way a cable, conduit or the like may be received within the slot.

The cutter arrangement may comprise an anvil. The anvil may be movable or drivable from a first position to a second position, e.g. by an anvil driving arrangement. By this arrangement the anvil may be moved from the first position, where a jaw of the slot is open, to the second position, where a jaw or mouth of the slot is closed. In said second position a cable may be retained/trapped within the slot. The anvil may be movable, e.g. slidably movable transversely to the line. The anvil may be movable so as to close or open the jaw or mouth of the slot.

The cutter arrangement may comprise a cutter blade. The cutter blade may be provided slidably within the cutter body. There may be provided a cutter blade driving arrangement, e.g. for moving the cutter blade from a first position to a second position. In said first position of the cutter blade, the cutter blade may be distal the throughhole/closed space of the slot. In said second position of the cutter blade, the cutter blade may be within the throughhole/closed space of the slot. In said second position of the cutter blade, a cutting or distal edge of the cutter blade may abut/strike/contact/the anvil, e.g. when the anvil is in the anvil second position.

In this way, movement of the cutter blade from the first position to the second position thereof may cause the cutter blade to cut/slice through a cable/conduit or the like entrapped within the throughhole or closed space of the cutter slot. The cutter blade may do such by crossing from one side to another side of the line.

It will be appreciated from the above that, in use, the cutting arrangement may act as a guillotine for cutting a cable, conduit or the like.

The arrangement for moving the grabbling elements may comprise a first motive arrangement or means, which may comprise a first hydraulic drive.

The arrangement for moving the cutter body may comprise a second motive arrangement or means, which may comprise a second hydraulic drive.

The arrangement for moving the anvil may comprise a third motive arrangement or means, which may comprise a third hydraulic drive.

The arrangement for moving the cutter blade may comprise a fourth motive arrangement or means, which may comprise a fourth hydraulic drive.

Preferably the throughhole or closed space may be distal or spaced from said anvil second position, e.g. when viewed along a direction of the centre line. Such arrangement may provide that the anvil may be deployed, e.g. moved from said anvil first position to said anvil second position without touching a cable retained in the throughhole.

There may be provided an arrangement or means for guiding a cable, conduit or the like into the slot as the grabber arrangement or grabber elements close around the cable, conduit or the like, e.g. as the grabber elements move from the first (open) position to the second (closed) position. The guide arrangement may comprise guide plates provided on each side of the slot.

The tool may comprise a body, e.g. a main or central body, e.g. from which the first and second grabber elements may movably (pivotably) depend.

A gripper arrangement may be provided, e.g. between the first and second grabber elements, e.g. on the body.

The gripper arrangement may face (into) and/or comprise part of the throughhole or closed space.

The gripper arrangement may comprise a plurality of teeth, e.g. arranged in a plurality of rows.

In use, the gripper arrangement may contact (and grip/retain) a cable conduit, pipe or the like, e.g. an outer surface thereof.

According to a second aspect of the present invention there is provided an apparatus, such as a grabber and/or cutter apparatus, such as an underwater cable or conduit grabbing and cutting apparatus, comprising at least one tool, e.g. grabber and cutter tool, according to the first aspect of the present invention.

Preferably, the apparatus may comprise one or more line and/or wires. The one or more lines and/or wires may comprise a lifting wire and/or an orientation line. In use, the lines and/or wires may extend from a vessel or the like to the at least one tool.

According to a third aspect of the present invention there is provided a method of grabbing and/or cutting a cable, conduit, pipe or the like, such as an underwater cable or conduit, comprising the steps of:

providing at least one tool according to the first aspect of the present invention;

positioning said tool adjacent a cable or conduit.

Preferably the method may comprise grabbing the cable or conduit with the grabber arrangement.

Preferably the method comprises (subsequently) cutting the cable or conduit with the cutter arrangement.

The method may comprise holding or retaining a cable, conduit or the like by the grabber arrangement. Such holding or retention may cause the cable, conduit or the like to be moved into the slot. The slot may then be closed by the anvil, e.g. so as to hold or entrap the cable, conduit or the like within the slot. The cutter blade may then be moved, e.g. driven toward and/or against the anvil so as to cut the cable, conduit or the like.

Prior to cutting the cable, conduit or the like, the cable, conduit or the like may be held within the slot, e.g. between the cutter blade and the anvil.

BRIEF DESCRIPTION OF THE DRAWINGS

Embodiments of the present invention will now be described, by way of example only, and with reference to the accompanying drawings, which are.

DETAILED DESCRIPTION OF THE ENABLING EMBODIMENTS

Figure 1:
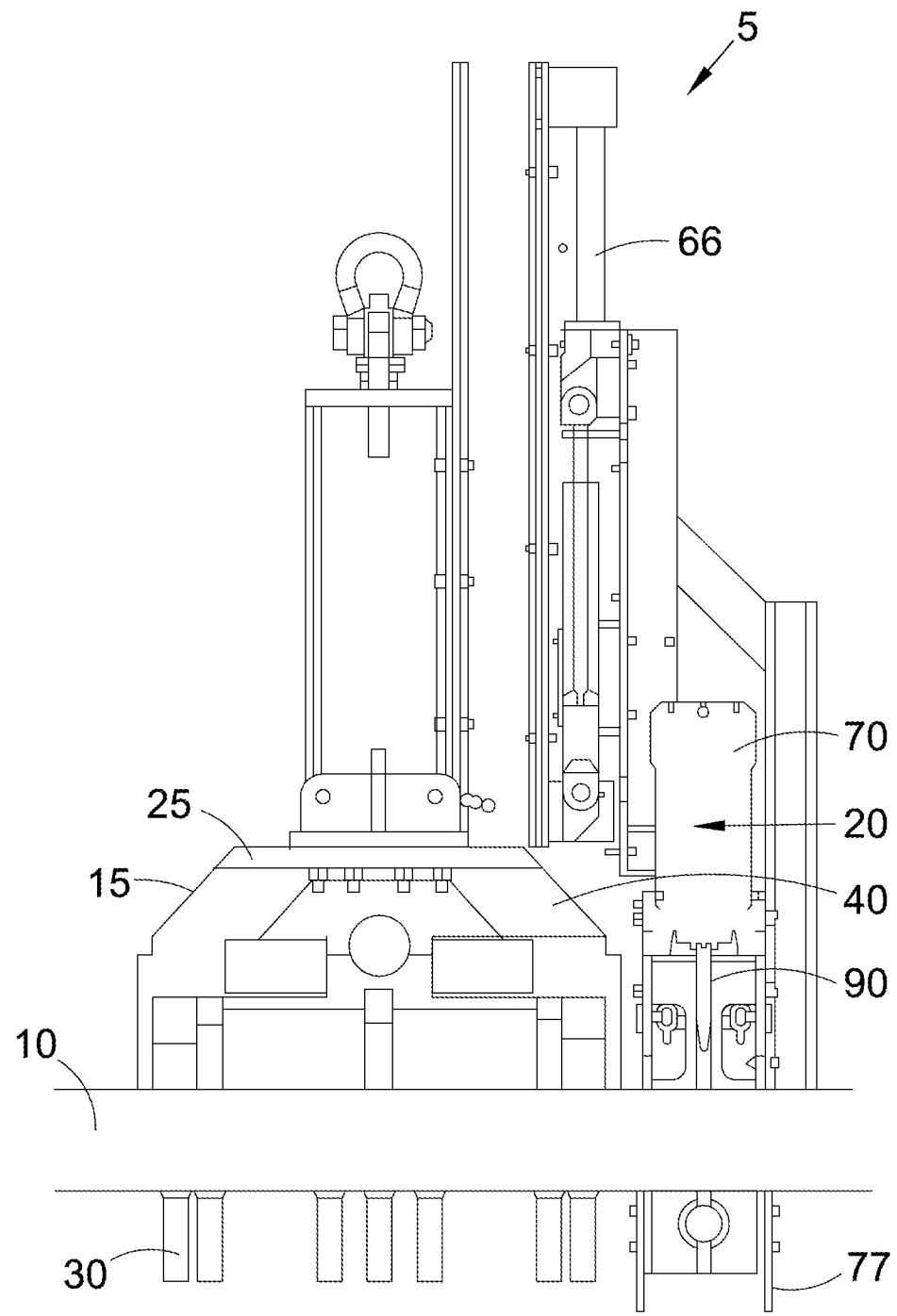
FIG. 1 is a sectional side view of a grabbing and cutting tool according to an embodiment of the present invention positioned over a cable.
Figure 2:
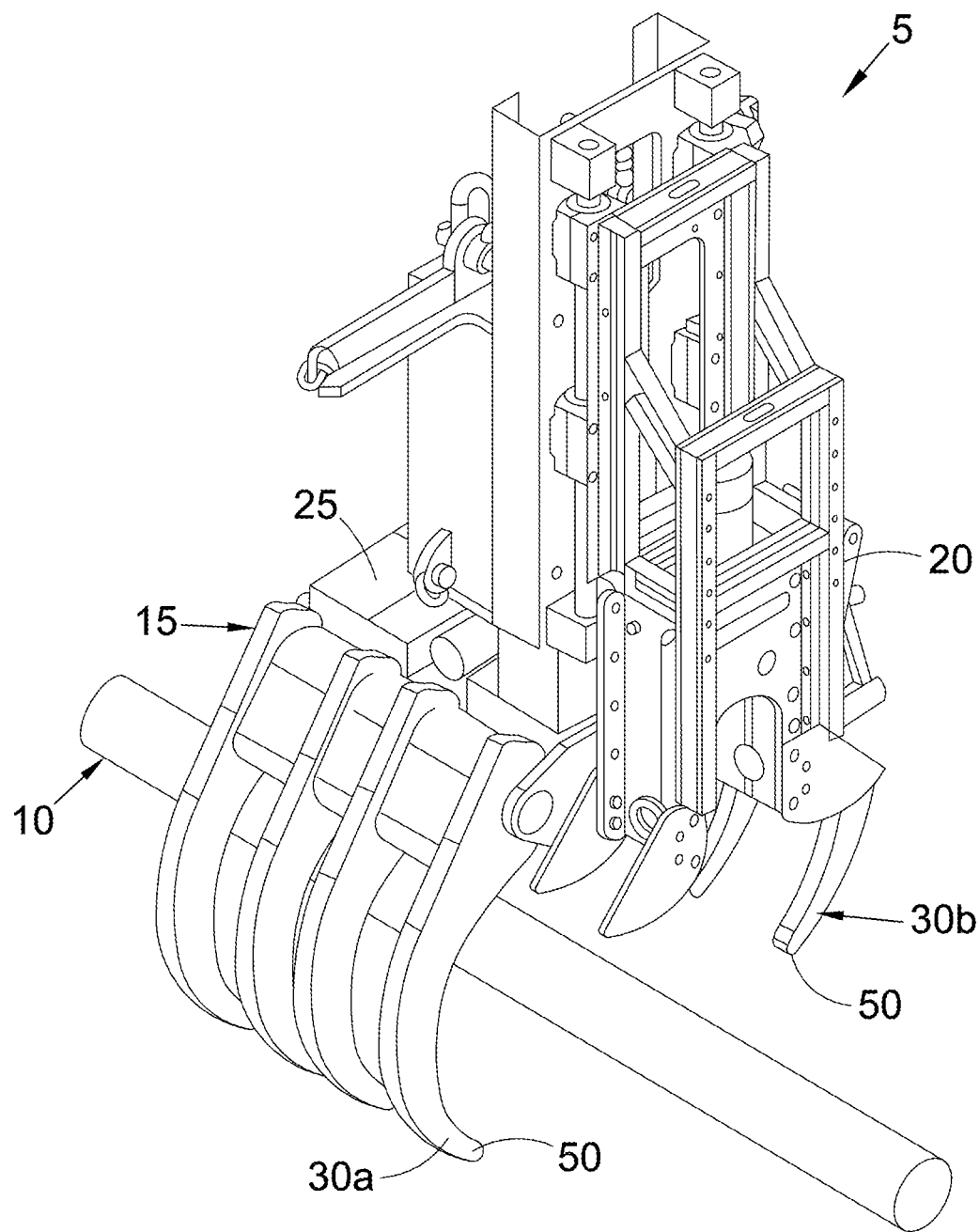
FIG. 2 is a perspective view of the grabbing and cutting tool of FIG. 1.

Referring initially to FIGS. 1 to 9, there is illustrated an embodiment of a grabbing and cutting tool or grabber and cutter tool, generally designated 5, according to an embodiment of the present invention. The tool 5 can be described or referred to as a cutting cable grab.

In this embodiment, the tool 5 comprises an underwater tool. The tool 5 is adapted to grab and to cut a cable 10 or a conduit, pipe or the like. The tool 5 comprises a (cable/conduit/pipe) grabber arrangement or means 15 and a (cable/conduit/pipe) cutter arrangement or means 20. The grabber arrangement 15 and the cutter arrangement 20 are connected rigidly, i.e. connected together, by one or more rigid members or a frame, generally designated 25.

The grabber arrangement 15 comprises a plurality of grabber elements 30. The grabber elements 30 comprise one or more first grabber elements 30a and one or more second grabber elements 30b.

The first grabber element(s) 30a are disposed on a first side 35a of the tool 5. The second grabber element(s) 30b are disposed on a second side 35b of the tool 5. The first/second grabber elements 30a, 30b are pivotably attached to a (main) body, generally designated 40, of the tool 5. The first/second grabber elements 30a, 30b can be conveniently be referred to as arms or fingers. The first/second grabber elements 30a, 30b are typically curved or arcuate in shape. A concave surface 45 of each grabber element 30 faces towards a centre line C of the tool 5. A convex surface 46 of each grabber element 30 faces away from the centre line C of the tool 5. The/each grabber element 30 is in the form of a claw, talon or tine.

When in an open disposition of the grabber arrangement 15, the/each first/second grabber element 30a, 30b is disposed on the respective first/second side 35a, 35b of the tool 5. When in a closed disposition of the grabber arrangement 20, a distal end 50 of each first/second grabber element 35a, 35b is disposed on the respective second/first side of the tool 5.

By this arrangement, in said open disposition, the grabber elements 30a, 30b provide an open jaw 55 for receiving a cable 10. By this arrangement, in said closed disposition, the grabber elements 30a, 30b provide a closed jaw 55 having an internal space or throughhole 65 (i.e. transverse closed space or longitudinal throughhole) for grabbing and/or holding and/or retaining the cable 10.

It will be appreciated from the above that, in use, the grabber elements 30a, 30b move in overlapping co-action so as to effectively provide a scissor type action.

The tool 5 comprises longitudinally extending line C. The line C is coincident with a position where a cable 10 is grabbed (and retained) by the tool 5, in use. The throughhole 65 is substantially centred on the line C.

The grabber arrangement 15 and the cutter arrangement 20 are spaced one from the other along said line C. As can be seen from FIG. 1, the grabber arrangement 15 and the cutter arrangement 20 are provided proximal or adjacent one another on said line C.

The cutter arrangement 20 comprises a cutter body 70. The cutter body 70 is movable or slidably attached to a/the main body 40 of the tool 5. The cutter body 70 is slidable perpendicularly to said line C along a second line C2, which second line C2 intersects said line C. The cutter body 70 comprises a cutter slot 75. The cutter slot 75 is disposed transverse to the line C. The grabber elements 30 are disposed (so as to move) transverse to the line C. The slot 75 is adapted for receiving the cable 10. The cutter body 70 is movable along said second line C2 such that the slot 75 coincides with the line C. In this way the cable 10 can be received within the slot 75.

The cutter arrangement 20 comprises an anvil 80. The anvil 80 is movable or drivable from a first position (see FIG. 10(C)) to a second position (see FIG. 10(D)), e.g. by an anvil driving arrangement. By this arrangement the anvil 80 is moved from the first position, where a jaw 85 of the slot 75 is open to the second position where the jaw 85 or mouth of the slot 75 is closed. In said second position the cable 10 can be retained/trapped within the slot 75. The anvil 80 is movable, i.e. slidably movable, transversely and perpendicular to the line C and perpendicular to the second line C2. The anvil 80 is movable so as to selectively close or open the jaw 85 of the slot 75.

The cutter arrangement 20 comprises a cutter blade 90. The cutter blade 90 is provided slidably within the cutter body 70. There is provided a cutter blade driving arrangement, e.g. for moving the cutter blade 90 from a first position to a second position. In said first position of the cutter blade 90, the cutter blade 90 is distal the throughhole 65 of the slot 75. In said second position of the cutter blade 90, the cutter blade 90 is within the throughhole 65 of the slot 75. In said second position of the cutter blade 90, a cutting or distal edge 95 of the cutter blade 90 abuts/strikes/contacts the anvil 80, i.e. when the anvil 80 is in the anvil second position.

In this way, movement of the cutter blade 90—from the first position to the second position thereof—causes the cutter blade 90 to cut/slice through the cable 10 entrapped within the throughhole 65 of the cutter slot 75. It will be appreciated from the above that, in use, the cutter arrangement 20 acts as a guillotine for cutting a cable 10.

The throughhole 65 is distal or spaced from said anvil 80 second position, e.g. when viewed along a direction of the centre line C. Such arrangement provides that the anvil 80 can be deployed, e.g. moved from said anvil 80 first position to said anvil 80 second position without touching the cable 10 retained in the throughhole 65.

There is provided an arrangement or means 76 for guiding a cable 10 into the slot 75 as the grabber arrangement 15 or grabber elements 30 close around the cable 10, e.g. as the grabber elements 30a, 30b move from the first (open) position to the second (closed) position. Guide arrangement 76 comprises guide plates 77 provided on each side of the slot 75.

The arrangement for moving the grabbing elements 30 comprises a first motive arrangement, which typically comprises a first hydraulic drive cutter body. The arrangement for moving the cutter body 70 comprises a second motive arrangement, which typically comprises a second hydraulic drive. The arrangement for moving the anvil 80 comprises a third motive arrangement and typically comprises a third hydraulic drive. The arrangement for moving the cutter blade 90 comprises a fourth motive arrangement or means, which may comprise a fourth hydraulic drive.

The present invention also provides an apparatus, such as a grabber and/or cutter apparatus, such as an underwater cable grabber and cutter apparatus generally designated 99. The apparatus 99 comprises at least one grabber and cutter tool 5.

The grabber and cutter apparatus 99 comprises one or more line and/or wires 100, 105. The one or more lines and/or wires 100, 105 comprises a lifting wire 100 and an orientation line 105. In use, the lines and/or wires 100, 105 extend from a vessel (not shown) or the like to the at least one grabbing and cutting tool 5. An orientation arm 110 is also provided.

The present invention also provides a method of grabber and/or cutting a cable 10, conduit, pipe or the like, such as an underwater cable, conduit or pipe, comprising the steps of:
 providing at least one tool 5;
 positioning said tool 5 adjacent a cable 10.

The method comprises grabbing the cable 10 with the grabbing arrangement 15. The method comprises cutting the cable 10 with the cutter arrangement 20.

The disclosed first embodiment of the present invention will now be further described with reference to FIGS. 1 to 10(E).

The tool 5 is typically deployed from a crane or winch, suspended over a side or rear of a vessel (ship) from a lifting wire 100. An orientation line (or lines) 105 attached to one (or both) of the ends of the orientation arm 110, is (are) operated from a position of the ship to the side of the lifting wire 100, and is (are) used to keep the tool 5 in a correct orientation across the cable 10 in order to correctly engage such. Alternatively, the tool 5 can be fitted with a thruster or thrusters to keep the tool 5 correctly oriented. Alternatively, ROV handles can be fitted to the tool 5 so that a free-flying ROV can latch onto the tool 5 and manoeuvre such into place. Sonar and/or video cameras can be mounted to front and rear sides of the tool 5 to aid guidance onto the cable 10 or video feed from a free-flying ROV can be used for such purpose.

Figure 3:
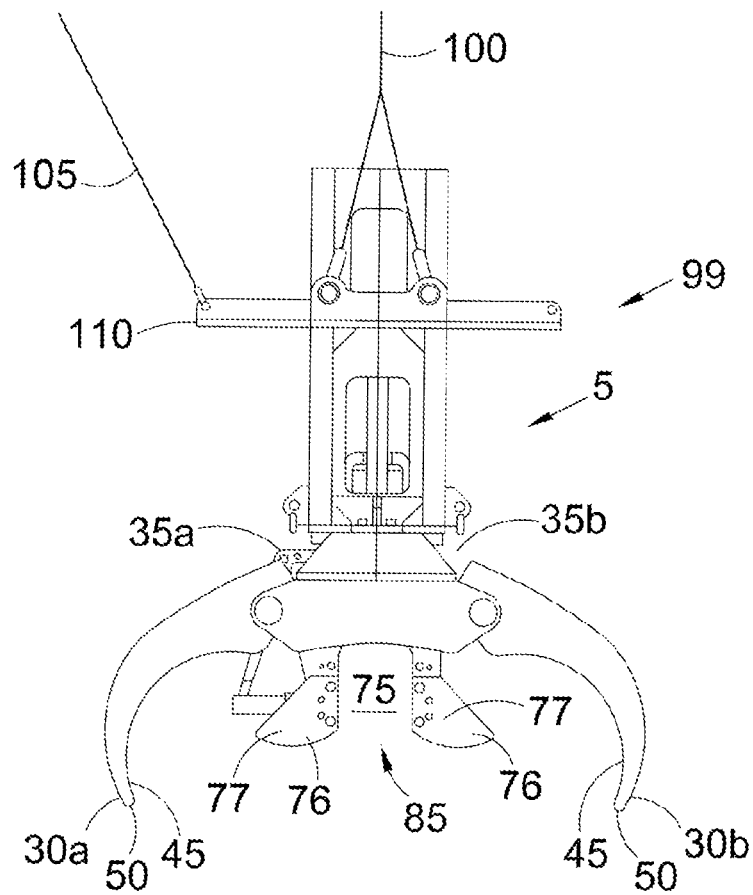
FIG. 3 is an end view of the grabbing and cutting tool of FIG. 1 with grabbing elements in an open disposition.
Figure 4:
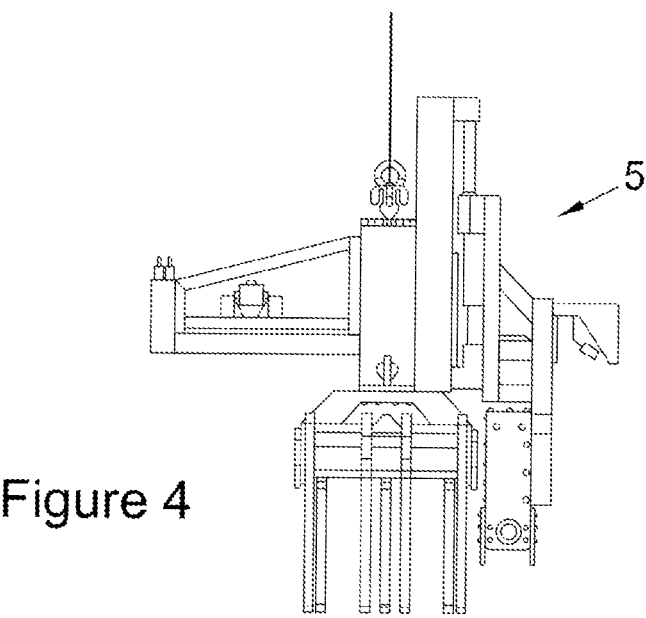
FIG. 4 is a side view of the grabbing and cutting tool of FIG. 1.
Figure 5:
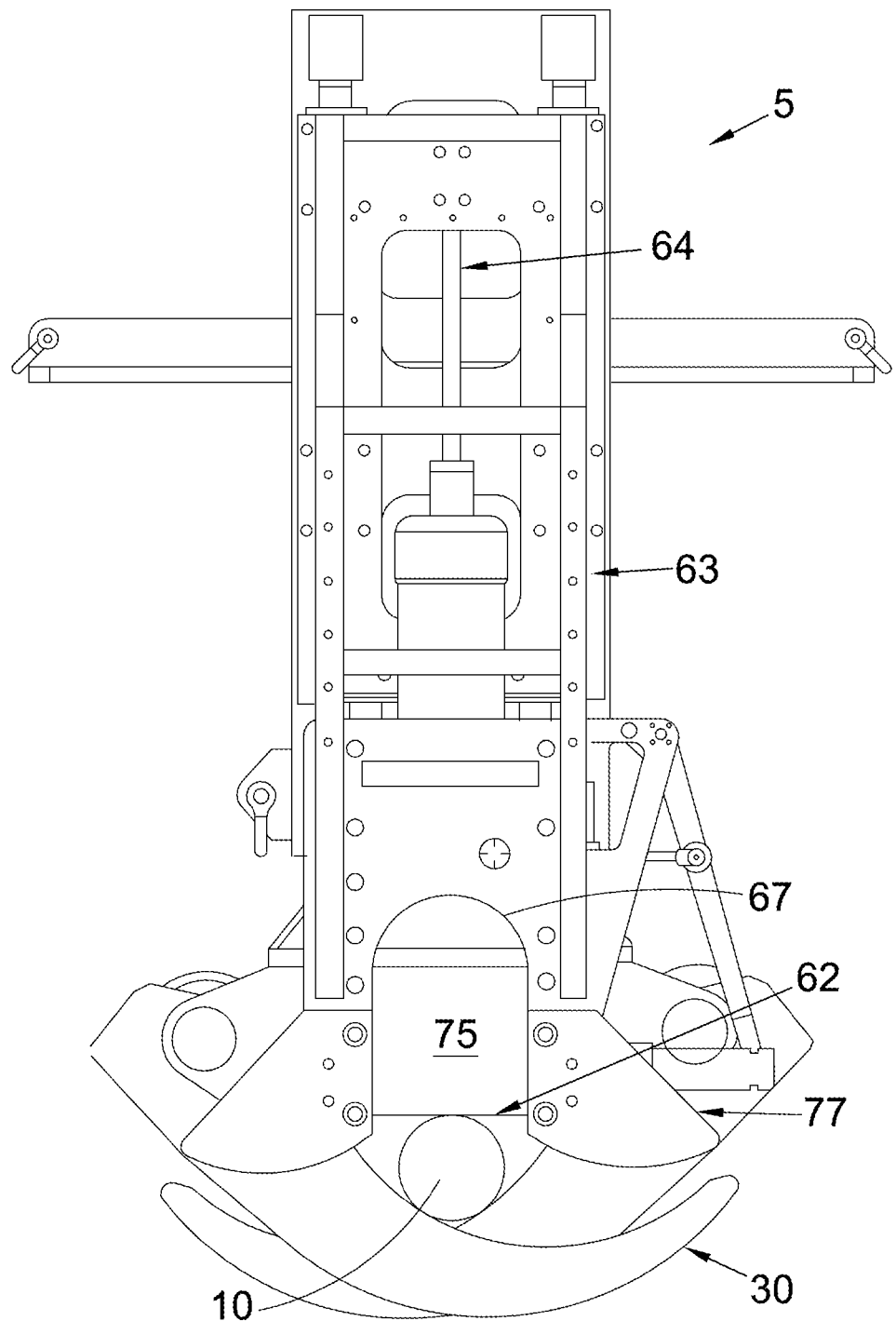
FIG. 5 is a further end view of the grabbing and cutting tool of FIG. 1 with grabbling elements in a closed disposition.

The tool 5 is lowered over the cable 10 with the grabber arrangement 15 in the open position—see FIG. 3. The wide opening of the grabber elements 30a, 30b grabber arms, allow for easy positioning of the tool 5 over the cable 10 with a wide margin for error. This is in contrast to endeavouring to position the cutter arrangement 20 and cable 10 together, and preventing the cable 10 from popping out of the cutter slot 75 while the anvil 80 is being deployed, something not easily achieved subsea, particularly at depth, during even mild swells, or in areas of current.

Figure 10A:
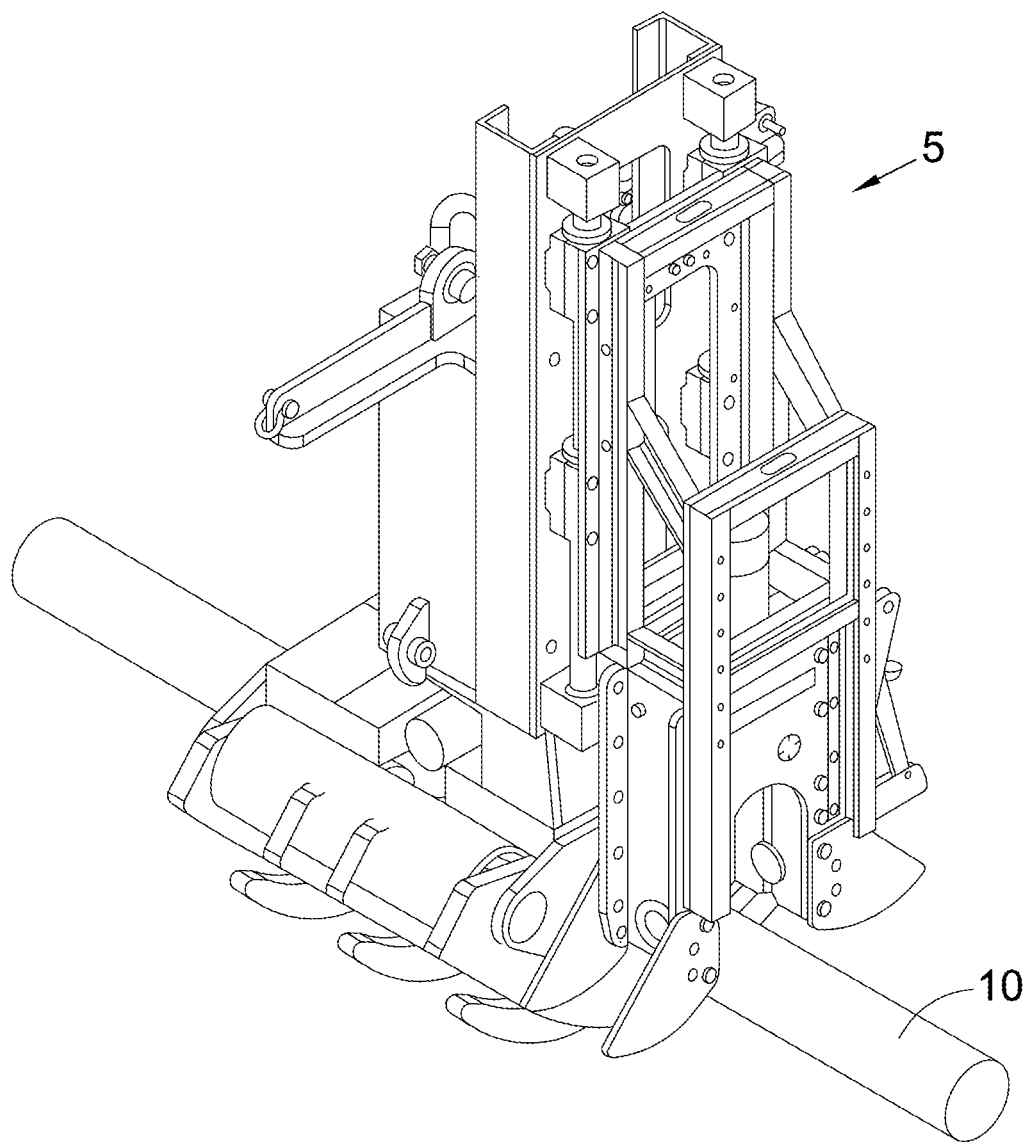
FIGS. 10(A) to (E) are a sequence of perspective views of the grabbing and cutting tool of FIG. 1 showing the grabbing and cutting tool being positioned relative to a cable, grabbing the cable and cutting the cable.
Figure 10B:
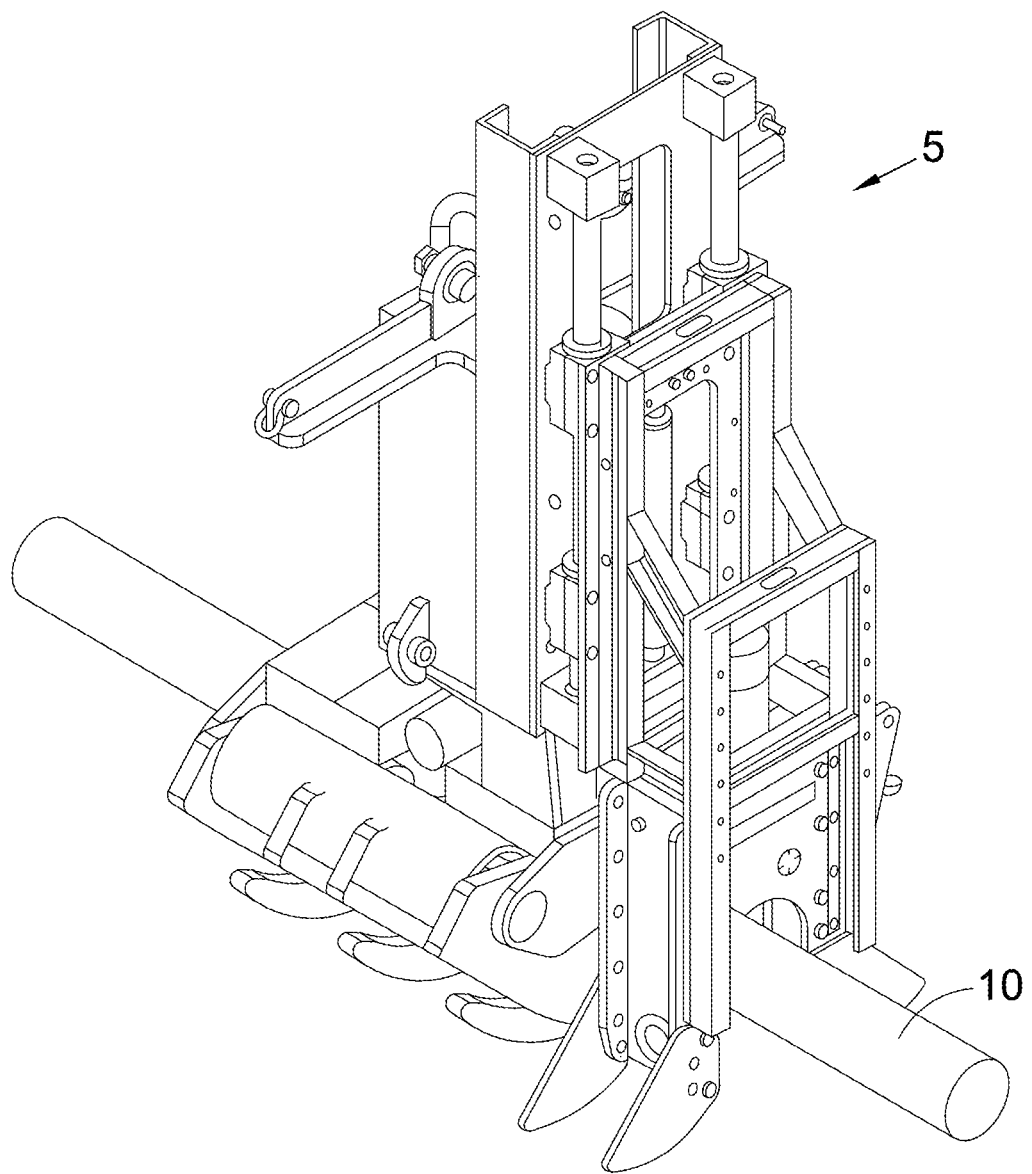

The grabber elements 30a, 30b or grabber tines, which can be hydraulically operated, are then closed capturing the cable 10—see and FIG. 10(A). The guide plates 77 create an open angle of not less than 85° between the grabber tines 30 and a grabber base plate 62 to ensure that the cable 10 does not become pinched between grabbing elements 30a, 30b and the base plate 62 of the tool 5, and that the cable 10 is maneuvered successfully into a correct position for engaging in the cutter arrangement 20—see FIG. 5.

Up to this point, a trolley 63 onto which the cutter arrangement 20 is mounted, is held in a distal (high) position by a force of a hydraulic cylinder 64, which at this stage is in an extended position.

Figure 6:
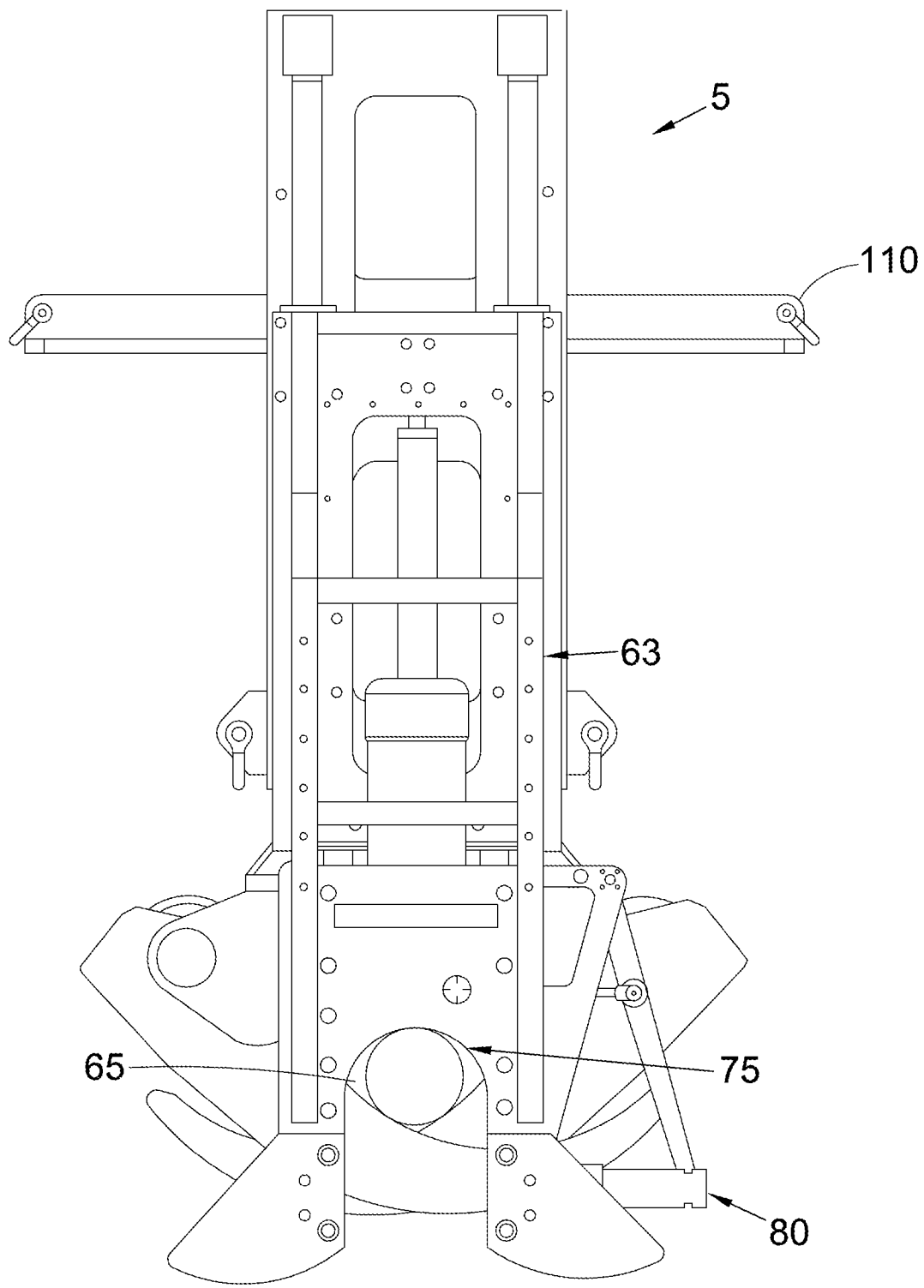
FIG. 6 is an end view of the grabbing and cutting tool of FIG. 1 with the grabbing elements in a closed disposition and an anvil not deployed.
Figure 10C:
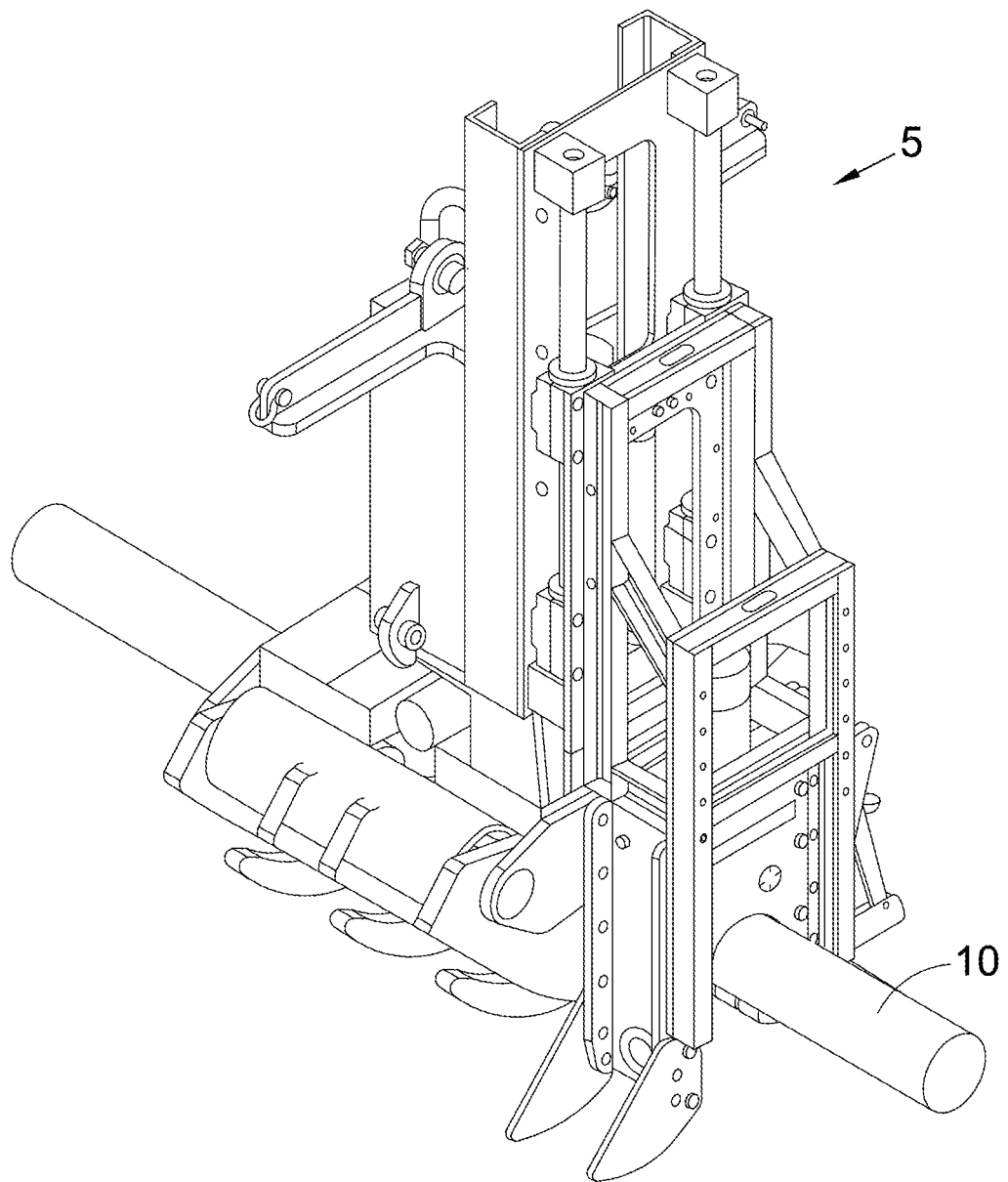

The trolley 63 is now slid (downwards) along guide rails 66, either by application of hydraulic pressure to retract the hydraulic cylinder 64 or under the force of gravity with the removal of hydraulic pressure acting to extend the hydraulic cylinder 64, till the cable 10 is in contact with a top portion 67 of the cutter slot 75—see FIGS. 6 and 10(C).

Figure 7:
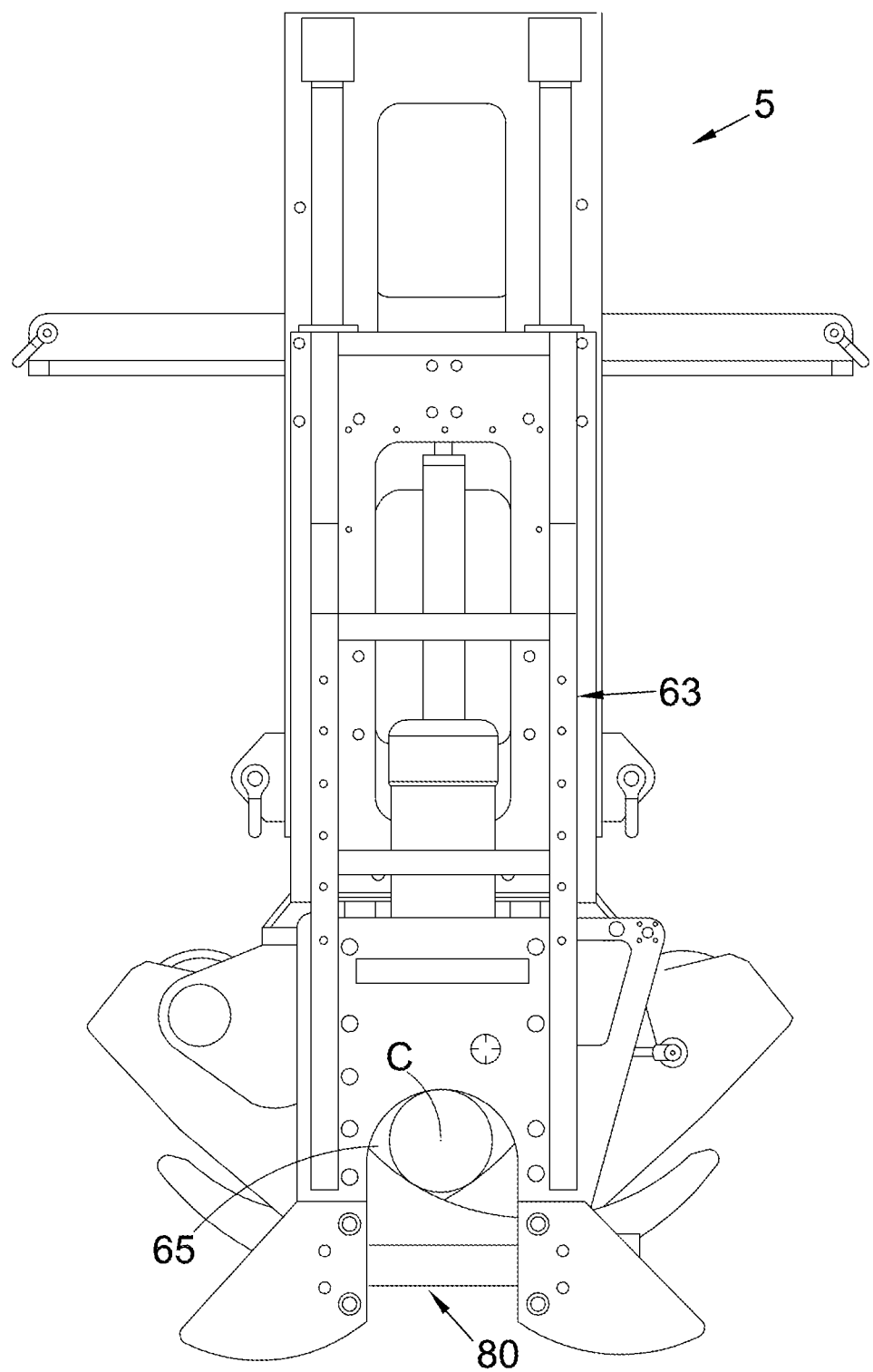
FIG. 7 is an end view of the grabbing and cutting tool of FIG. 1 with the grabbing elements in a closed disposition and the anvil deployed.
Figure 8:
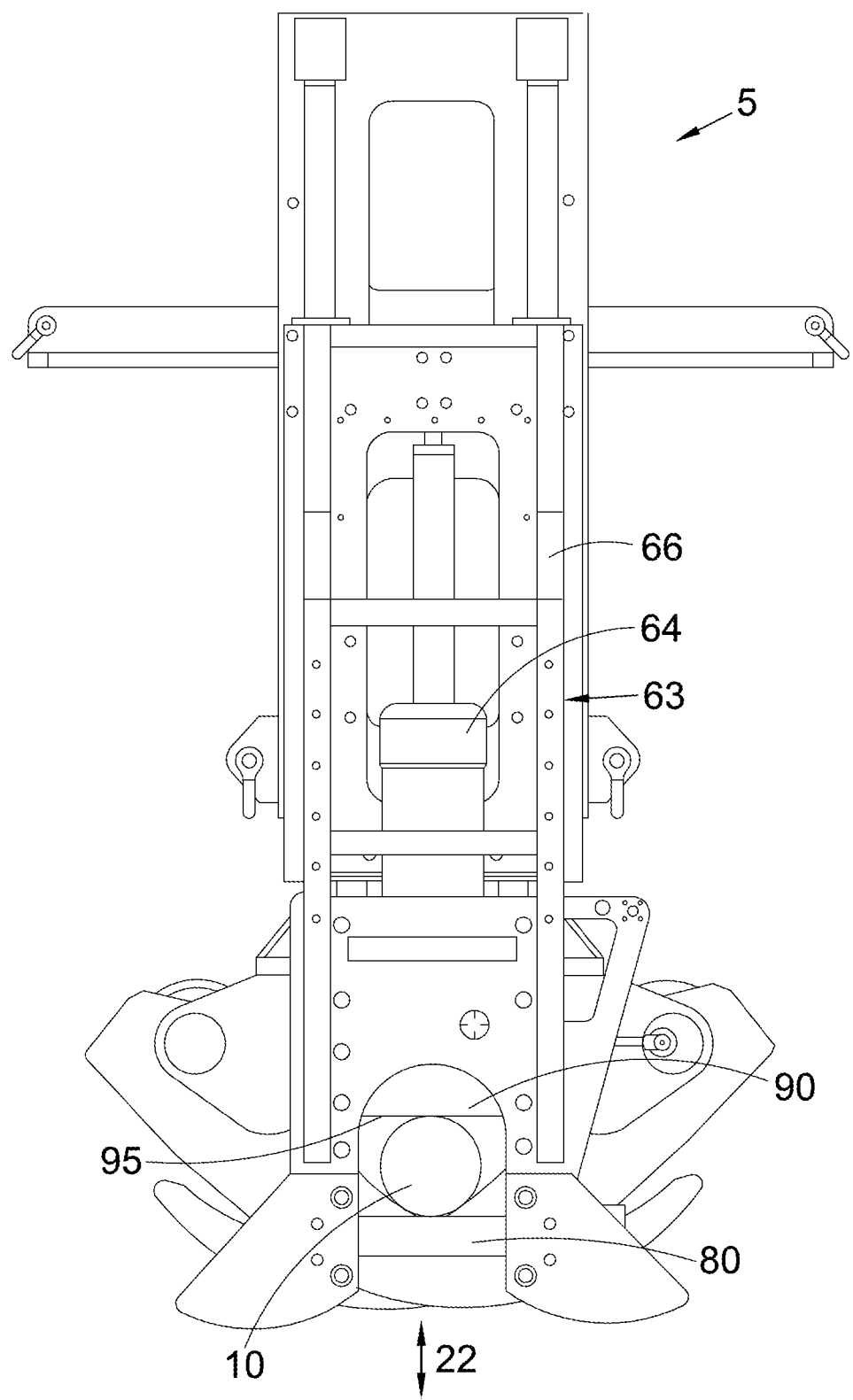
FIG. 8 is an end view of the grabbing and cutting tool of FIG. 1 with the grabbing elements in a closed disposition, the anvil deployed and a cutter blade ready for deployment.
Figure 9:
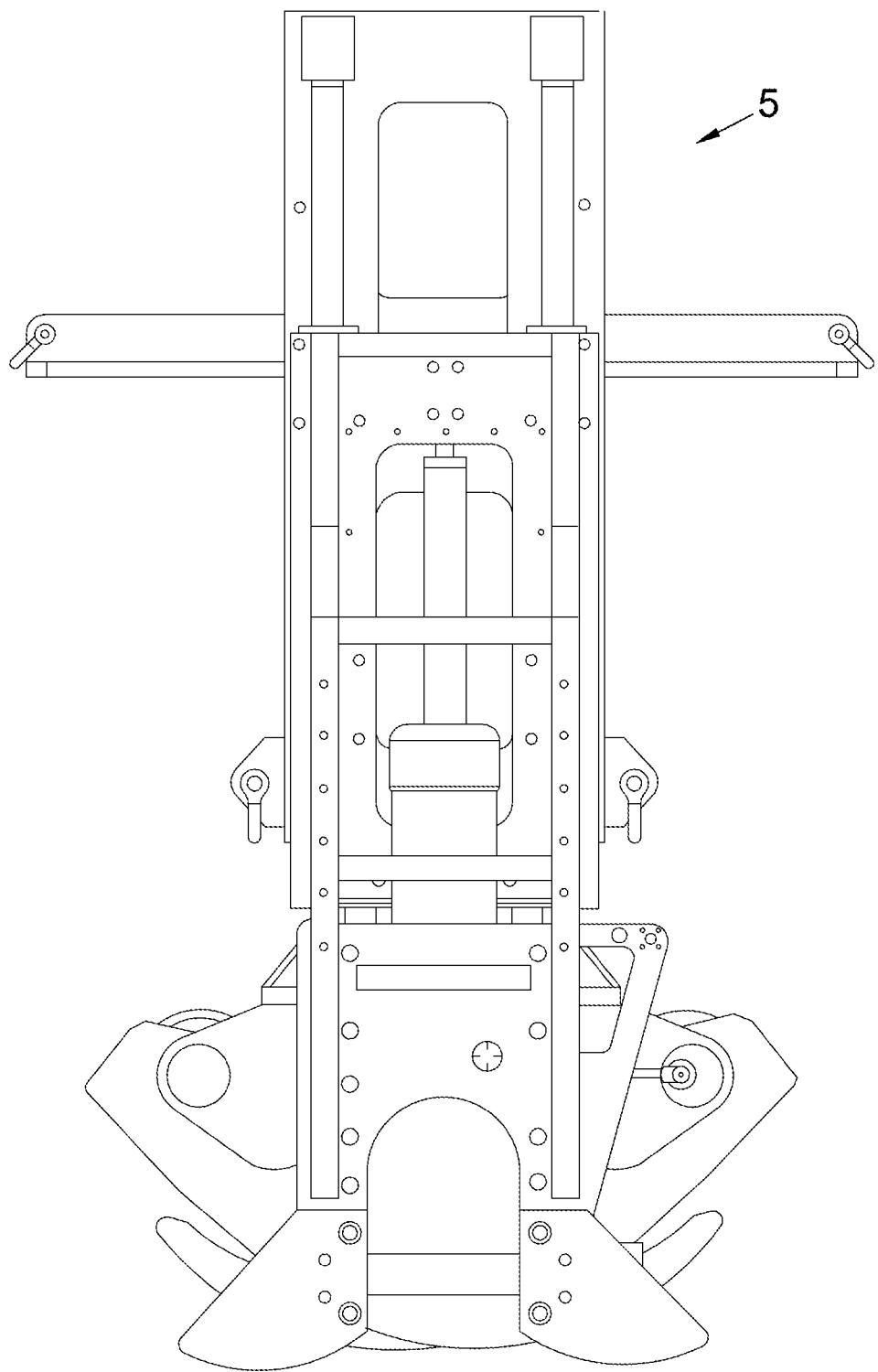
FIG. 9 is an end view of the grabbing and cutting tool of FIG. 1 with the grabbing elements in a closed disposition, the anvil deployed and the cutter blade deployed.
Figure 10D:
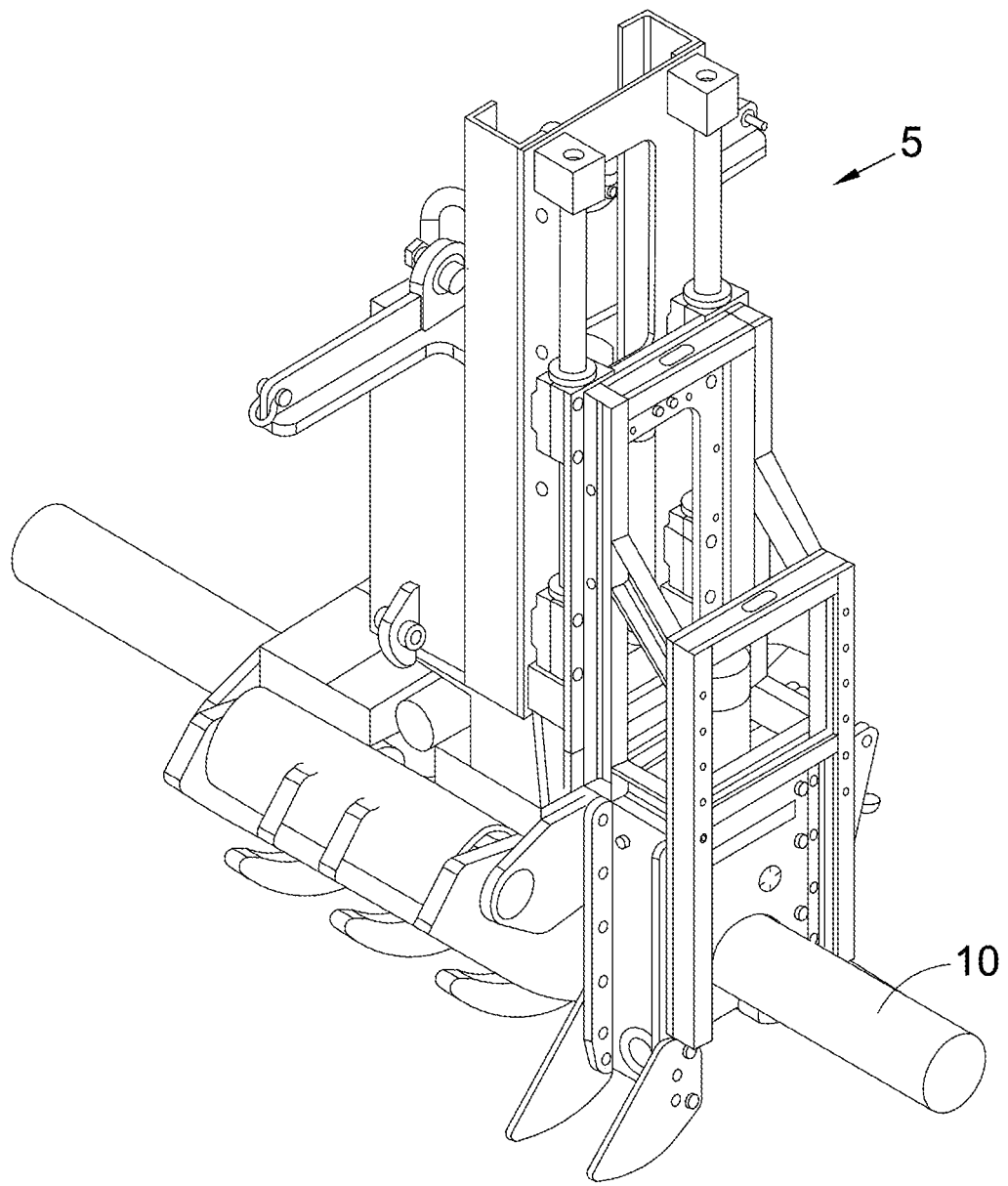

The anvil 80 is then deployed, sliding across a base/jaw/mouth of the cutter slot 75 and engaging in an aperture in an opposite side of the cutter slot 75—see FIGS. 7 and 10(D). The arrangement of the tool 5 seeks to ensure that the cable 10 is as far above the anvil 80 as possible while the anvil 80 is being deployed. This seeks to ensure that the anvil 80 will not contact the cable 10 as the anvil 80 is being deployed, a scenario which could lead to jamming or incomplete engagement of the anvil 80, which would lead to failure to cut the cable 10.

The hydraulic cylinder 64 is then put into a 'free float' condition, where a hydraulic fluid is allowed to pass freely from one side of the cylinder piston to the other. The cylinder 64, therefore, produces little resistance to movement of the trolley 63. The cutter blade 90 is then deployed. The cutter blade 90 is in this embodiment hydraulically operated. As the cutter blade 90 engages with the cable 10, a force of the cutter blade 90 pushes the entire cutter arrangement 20 and trolley 63 upwards till the anvil 80 meets the cable 10, FIGS. 8 and 10(D). At this point the cable 10 is now clamped between an anvil 80 and cutter blade 90, and the cutter blade 90 cuts through the cable 10, FIGS. 9 and 10(E).

As the grabber arrangement 15 is rigidly connected to the cutter arrangement 20 along the axis of the cable 10, there is no risk of lateral forces on the cutter blade 90, which could otherwise result in a broken blade and/or failure to achieve the cut.

Figure 10E:
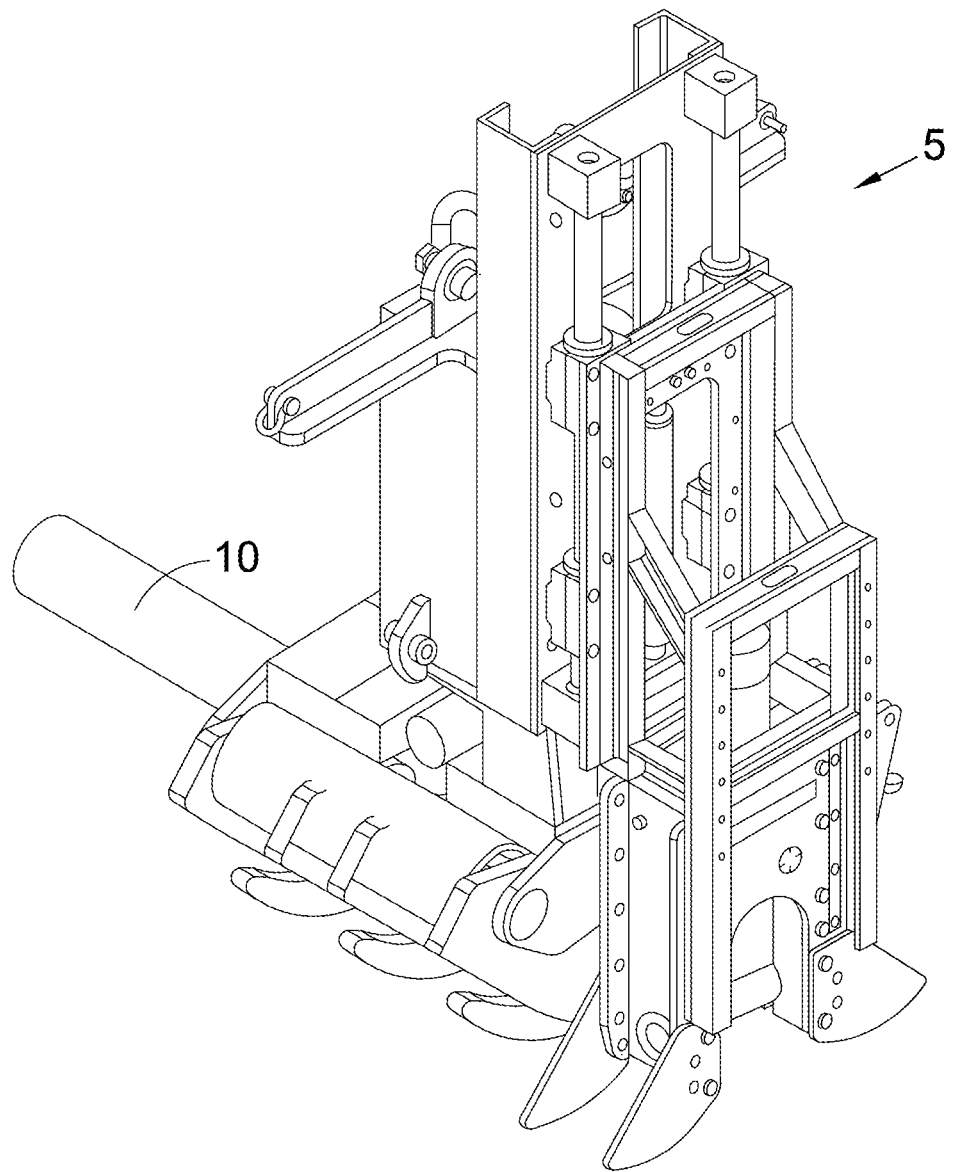

Once the cut of the cable 10 is complete, the entire tool 5 is recovered to surface with the grabber arrangement 15 still holding one end of the newly cut cable 10—see FIG. 10(E).

Figure 11:
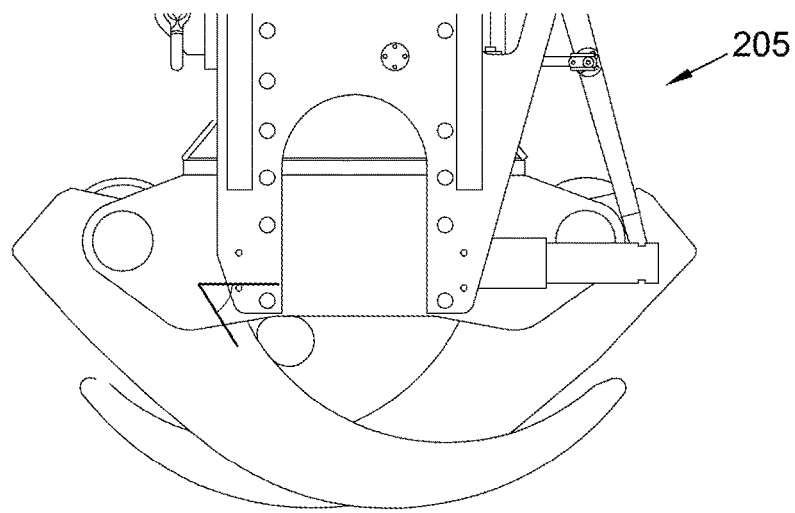
FIG. 11 is a partial sectional side view of a grabber and cutter tool according to a second embodiment of the present invention.
Figure 12A:
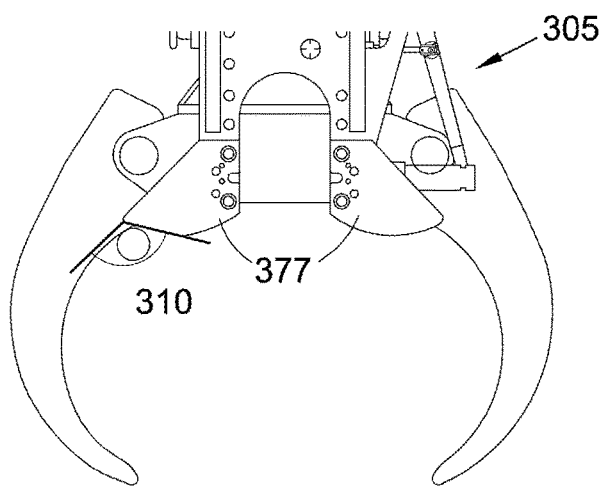
FIGS. 12(A) to (D) are a sequence of partial sectional side views of a grabber and cutter tool according to a third embodiment of the present invention, showing how the tool grabs and holds a cable, in use.
Figure 12B:
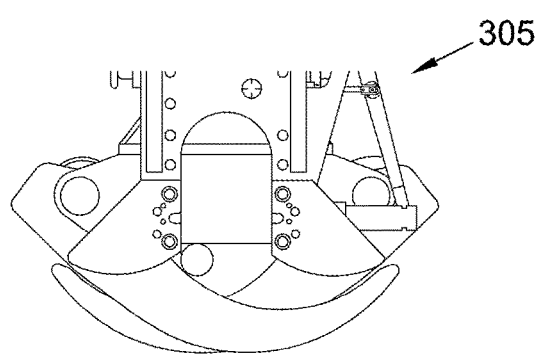
Figure 12C:
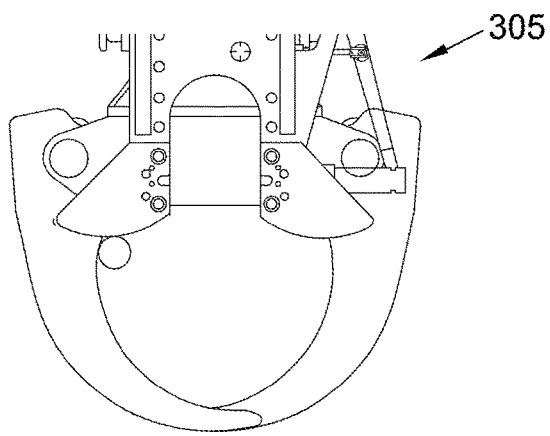
Figure 12D:
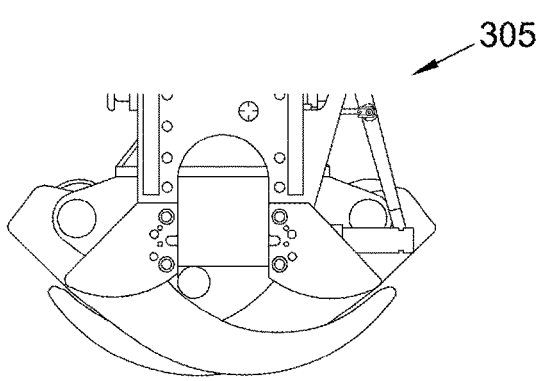

Referring now to FIG. 11, there is shown a grabber and cutter tool, generally designated 205, according to a second embodiment of the present invention. The tool 205 is similar in many respects to the tool 5 of FIG. 1, like parts being designated with like numerals, but iterated by '200'. However, the tool 205 of FIG. 11 does not include guide plates.

When a relatively small diameter cable 210 is captured in a relatively large grab, there is a risk of the cable 210 becoming trapped between the grab elements 230a, 230b and grabber base plate 262 before it is in line with the cutter slot 275, as can be seen from FIG. 11. This prevents the cutter 220 from being able to slide into place. This is due to the acute angle between the grab elements 230a, 230b the grabber base plate 262.

Referring now to FIGS. 12(A) to (D), there is shown a grabber and cutter tool, generally designated 305, according to a third embodiment of the present invention. The tool 305 is similar in many respects to the tool 5 of FIG. 1, like parts being designated with like numerals, but iterated by '300'. Unlike the tool 205, the tool 305 has guide plates 377. The guide plates 377 maintain an open angle between the grabber elements 330 and the main body 340. Therefore, unlike the tool 205, in the tool 305 the cable 310 is not liable to get trapped off-centre due to the acute angle between the grabber elements 335a, 335b and main body 340.

Figure 13A:
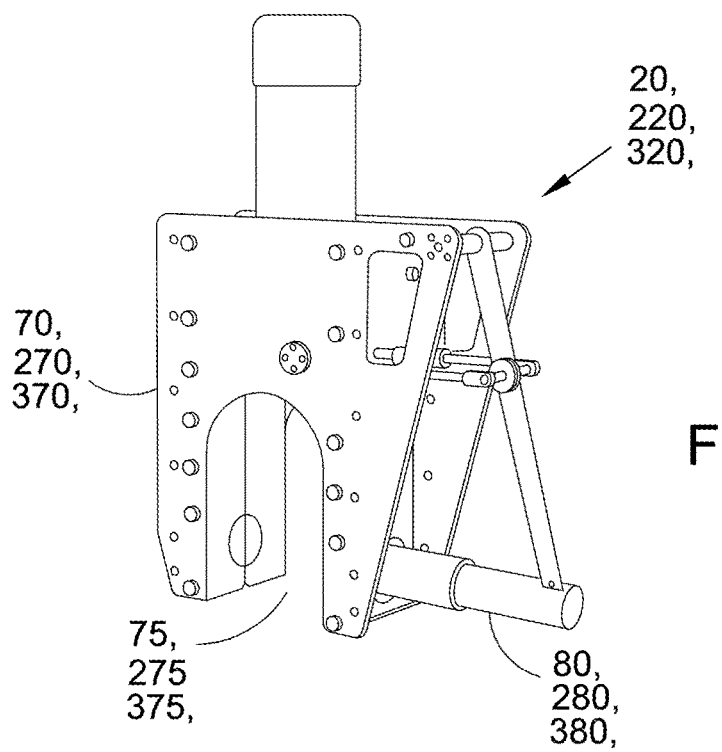
FIGS. 13(A) to (C) are a perspective view from one side and one end, an end view and a top view of a cutter arrangement capable of use in any of the foregoing first to third embodiments of the present invention.
Figure 13B:
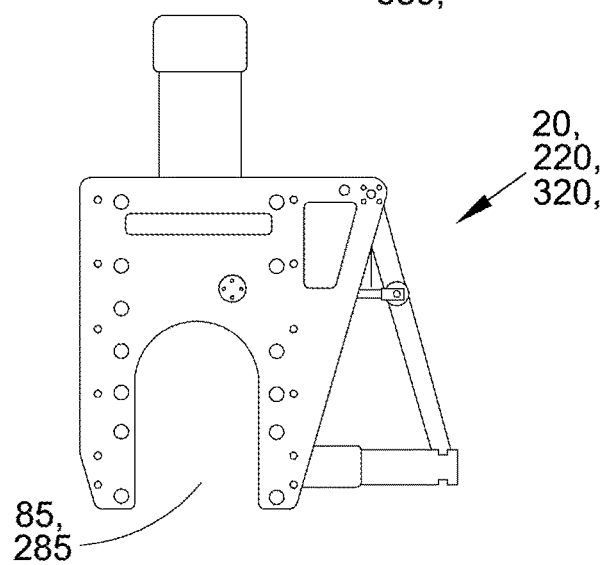
Figure 13C:
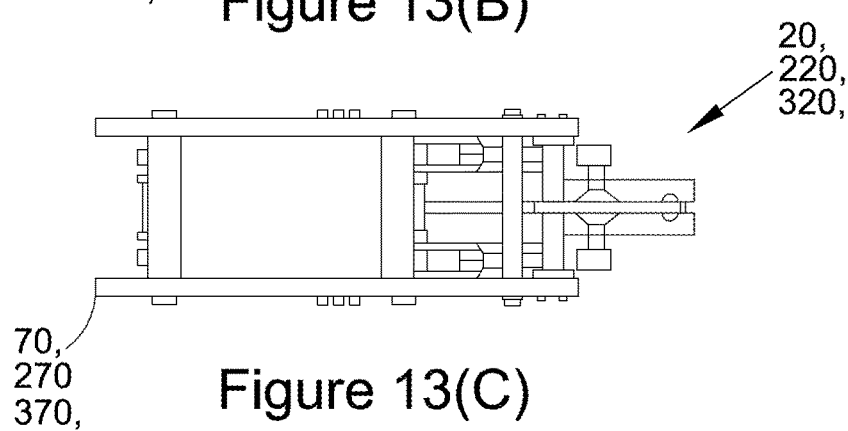

Referring now to FIGS. 13(A) to (C), there is shown a series of views of a cutter arrangement 20, 220, 320 capable of use in any of the first to third embodiments of FIGS. 1 to 10(D), FIG. 11, or FIGS. 12(A) to (D), respectively.

Figure 14A:
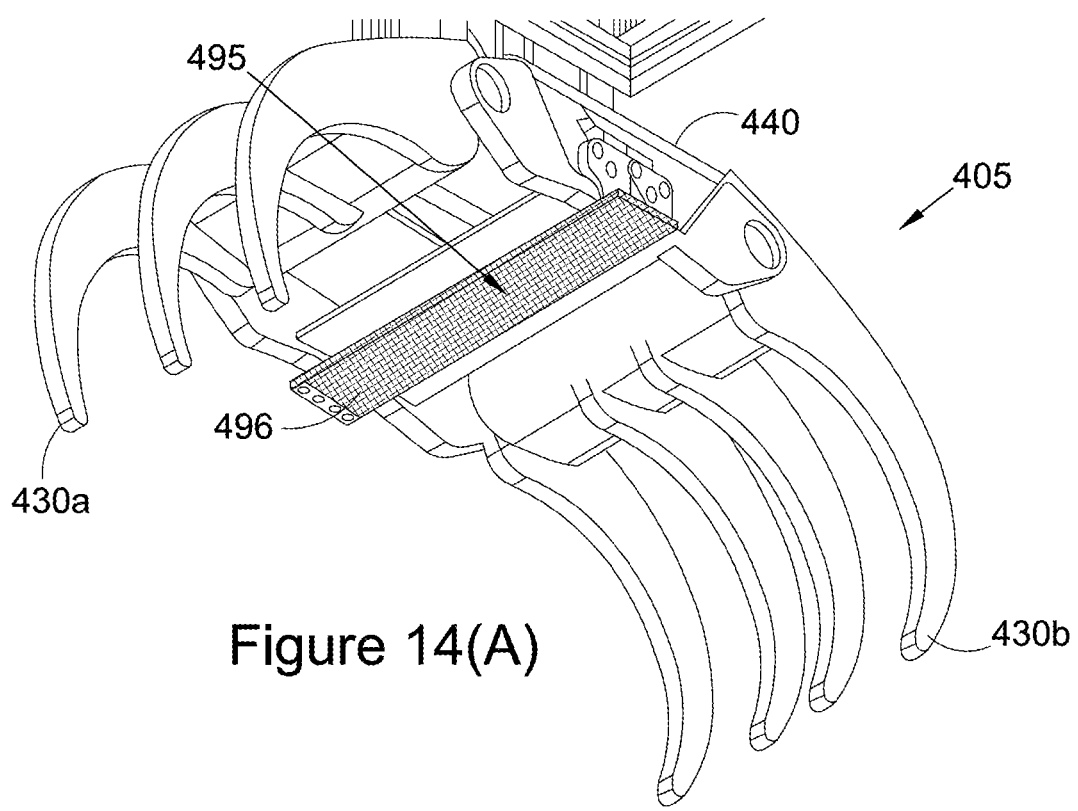
FIGS. 14(A) and (B) are a perspective view from one side, one end and below of a grabber and cutter tool according to a modified embodiment of the present invention.

Referring now to FIGS. 14(A) and (B), there is shown a grabber and cutter tool, generally designated 405, according to a modified embodiment of the present invention. The tool 405 is similar in many respects to the tool 5 of FIG. 1, like parts being designated with like numerals, but iterated by "400".

The tool 405 comprises main body 440 from which the first and second grabber elements 430a, 430b movably/pivotably depend. A gripper arrangement 495 is provided between the first and second grabber elements 430a, 430b, on the main body 440. The gripper arrangement 495 faces into and/or comprises part of the throughhole 465 or closed space. The gripper arrangement 495 comprises a plurality of teeth 496, which in this embodiment are arranged in a plurality of rows.

In use, the gripper arrangement 495 contacts and grips/restrains a cable, conduit, pipe or the like held within the throughhole 465.

The tool 405 is typically used towards the cut end of a cable. As the cable is being retrieved to surface, imbalanced forces from the cable weight tend to act to try and pull the cable through the grabber jaws 455. This may be the case even if after a cut is made the tool 405 is repositioned some distance from the cut, particularly in deep water where it may not be practical to move the grab location far enough from the cut to ensure balanced forces all the way to surface. To resist these forces, an optional gripper arrangement 495 (gripper plate) consisting of a series of smaller toothed plates is installed on a base of the tool 405. As the cable is grabbed by the first and second grabber elements (430a, 430b) or tines and pressed upwards onto the gripper plate arrangement 495, the teeth 496 partially penetrate into an outer coating of the cable, thus greatly increasing the resistance of the tool 405 to longitudinal forces acting on the cable.

Figure 14B:
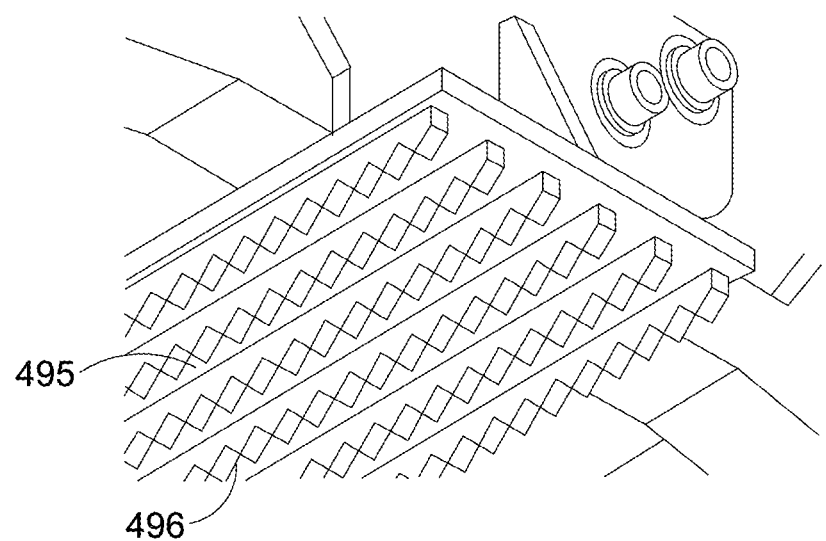

In preferable embodiments there can be between two and six rows of teeth, e.g. 30 mm to 70 mm apart, each row consisting of thirty to fifty teeth, each tooth typically being 5 mm to 20 mm high, 10 mm to 40 mm long, and 5 mm to 15 mm wide. FIG. 14(B) shows the rows in-line with the direction of the cable, but it will be appreciated that the rows of teeth may be at 90° to the cable.

It will be appreciated that the embodiments of the invention hereinbefore described are given by way of example only, and are not meant to be limiting to the scope of the invention. It will be appreciated that while the disclosed embodiments describe grabbing and cutting of a cable or underwater cable, other elongate articles, e.g. conduits, pipes or the like may also be grabbed and cut by tools according to the present invention.

What is claimed is:

1. A tool comprising:
   a grabber arrangement being movable from an open disposition for receiving a cable, conduit or pipe within the grabber arrangement to a closed disposition defining a through-hole for grabbing and retaining the cable, conduit or pipe along a center line C;
   a cutter arrangement disposed axially adjacent the grabber arrangement and including a cutter body defining a cutter slot being open towards the center line C;
   a hydraulic cylinder operatively coupled to the cutter arrangement and configured to apply a hydraulic pressure to the cutter arrangement to slide the cutter arrangement relative to the grabber arrangement from a distal position wherein the cutter slot is radially spaced from the center line C to a proximal position wherein the cutter slot is disposed along the center line C and receives the cable, conduit or pipe therein;
   the cutter arrangement including an anvil movable from a first anvil position to a second anvil position in response to the cutter arrangement being disposed in the proximal position to slide the anvil in radially spaced relationship with the center line C and close the cutter slot around the cable, conduit or pipe in the second anvil position; and
   the hydraulic cylinder switchable to a free float condition in response to the anvil being disposed in the second anvil position, wherein the free float condition is configured to remove the hydraulic pressure applied to the cutter arrangement and allow the cutter arrangement to freely move from the proximal position back towards the distal position until the anvil is disposed in abutting relationship with a bottom portion of the cable, conduit or pipe.

2. A tool according to claim 1, wherein the grabber arrangement and the cutter arrangement are connected together in a set disposition relative to one another.

3. A tool according to claim 1, wherein the grabber arrangement and the cutter arrangement are connected together by one or more rigid members or a frame.

4. A tool according to claim 1, wherein:
   the grabber arrangement comprises a plurality of grabber elements; and
   the grabber elements comprise one or more first grabber elements and one or more second grabber elements.

5. A tool according to claim 4, wherein:
   the one or more first grabber elements are disposed on a first side of the tool,
   the one or more second grabber elements are disposed on a second side of the tool,
   the one or more first grabber elements and the one or more second grabber elements are pivotally attached to a body of the tool,
   the one or more first grabber elements and the one or more second grabber elements are curved or arcuate in shape.

6. A tool according to claim 4, wherein when in the open disposition the one or more first grabber elements are disposed on a first side of the tool and the one or more second grabber elements are disposed on a second side of the tool.

7. A tool according to claim 4, wherein when in the closed disposition a distal end of each of the one or more first grabber elements is disposed on a second side of the tool and a distal end of each of the one or more second grabber elements is disposed on a first side of the tool.

8. A tool according to claim 4, wherein:
   in the open disposition the grabber elements provide an open jaw for receiving a cable, conduit or pipe, and
   in the closed disposition the grabber elements provide a closed jaw defining the through-hole.

9. A tool according to claim 1, wherein the center line C being coincident with a position where a cable, conduit or pipe is grabbed and retained by the tool, in use, and
   the through-hole is centred on the center line C.

10. A tool according to claim 1, wherein:
    the anvil is movable from the first anvil position to the second anvil position by an anvil driving arrangement, and
    the anvil is movable transversely to the center line C.

11. A tool according to claim 1, wherein a cutter blade driving arrangement is provided for slideably moving the cutter blade from a first cutter position to a second cutter position.

12. A tool according to claim 1, wherein:
    there is provided means for guiding the cable, conduit or pipe into the through-hole as the grabber arrangement is moved to the closed disposition and closes around the cable, conduit or pipe.

13. A tool according to claim 1, wherein the grabber arrangement and the cutter arrangement are adapted to respectively grab and cut the cable, or a conduit or pipe, such as an underwater cable or underwater conduit or pipe.

14. A tool according to claim 1, wherein the grabber arrangement is adapted to retain an end of the cable, conduit, or pipe after cutting of the cable, conduit, or pipe.

15. A tool according to claim 1, wherein the tool comprises a gripper arrangement.

16. An underwater cable, conduit, or pipe grabbing and cutting apparatus comprising at least one tool according to claim 1.

17. The apparatus according to claim 16, wherein the apparatus comprises one or more lines and/or wires.

18. The tool as set forth in claim 1, wherein the cutter arrangement includes a cutter blade slideably disposed within the cutter body, the cutter blade being slideable radially towards the center line C to engage a top portion of the cable, conduit or pipe with the cutter blade and wherein in response to the hydraulic cylinder being disposed in the free float condition slideable movement of the cutter blade out of the cutter body pushes the cutter arrangement upwardly towards the distal position to establish the abutting relationship of the anvil with the bottom portion of the cable, conduit or pipe and clamp the cable, conduit or pipe between the cutter blade and the anvil.

19. A method of grabbing and cutting an underwater cable, conduit or pipe, the method comprising:
    providing a tool according to claim 1;
    positioning said tool adjacent a cable, conduit, or pipe.

20. A method according to claim 19, wherein the method comprises grabbing the cable, conduit, or pipe with the grabber arrangement.

21. A method according to claim 20, wherein the method further comprises subsequently cutting the cable with the cutter arrangement.

* * * * *